(12) United States Patent
Bayraktar et al.

(10) Patent No.: US 11,149,642 B2
(45) Date of Patent: Oct. 19, 2021

(54) SYSTEM AND METHOD OF REDUCING POST-SHUTDOWN ENGINE TEMPERATURES

(71) Applicant: General Electric Company, Schenectady, NY (US)

(72) Inventors: Ilhan Bayraktar, West Chester, OH (US); Tuba Bayraktar, West Chester, OH (US); Mohamed Elbibary, West Chester, OH (US)

(73) Assignee: General Electric Company, Schenectady, NY (US)

( * ) Notice: Subject to any disclaimer, the term of this patent is extended or adjusted under 35 U.S.C. 154(b) by 864 days.

(21) Appl. No.: 14/984,531

(22) Filed: Dec. 30, 2015

(65) Prior Publication Data

US 2017/0191419 A1 Jul. 6, 2017

(51) Int. Cl.
*F02C 7/18* (2006.01)
*F02C 7/12* (2006.01)
(Continued)

(52) U.S. Cl.
CPC ............... *F02C 7/18* (2013.01); *B64D 33/08* (2013.01); *F01D 21/00* (2013.01); *F01D 25/24* (2013.01);
(Continued)

(58) Field of Classification Search
CPC .... F02C 9/18; F02C 9/52; F02C 7/125; F02C 6/08; F01D 25/24; F01D 25/26;
(Continued)

(56) References Cited

U.S. PATENT DOCUMENTS 3,632,221 A * 1/1972 Uehling .................... F02C 7/18
415/115
3,887,146 A * 6/1975 Bright ..................... B64C 29/00
244/12.1
(Continued)

FOREIGN PATENT DOCUMENTS

EP 2 514 930 A2 10/2012
EP 2 871 329 A1 5/2015
(Continued)

OTHER PUBLICATIONS

Machine Translation and Notification of Reasons for Refusal issued in connection with corresponding JP Application No. 2016-246078 dated Feb. 13, 2018.
(Continued)

*Primary Examiner* — Gerald L Sung
*Assistant Examiner* — Rene D Ford
(74) *Attorney, Agent, or Firm* — Dority & Manning, P.A.

(57) ABSTRACT

A cooling system configured to reduce a temperature within a gas turbine engine in a shutdown mode of operation includes a first gas turbine engine including a compressor having a bleed port. In a first operating mode of the gas turbine engine, the compressor bleed port is configured to channel a high pressure flow of air from the compressor. During a shutdown mode of operation, the compressor bleed port is configured to channel an external flow of cooling air into the compressor. The cooling system also includes a source of cooling air and a conduit coupled in flow communication between the compressor bleed port and the source of cooling air. The source of cooling air configured to deliver a flow of cooling air into the compressor through the compressor bleed port.

15 Claims, 3 Drawing Sheets

(51) Int. Cl.
- *F01D 21/00* (2006.01)
- *F01D 25/26* (2006.01)
- *B64D 33/08* (2006.01)
- *F01D 25/24* (2006.01)
- *F02C 9/18* (2006.01)
- *F04D 19/02* (2006.01)
- *F04D 27/00* (2006.01)
- *F02C 6/08* (2006.01)

(52) U.S. Cl.
CPC .............. *F01D 25/26* (2013.01); *F02C 7/125* (2013.01); *F02C 9/18* (2013.01); *F04D 19/02* (2013.01); *F04D 27/009* (2013.01); *F02C 6/08* (2013.01); *F05D 2220/32* (2013.01); *F05D 2240/24* (2013.01); *F05D 2260/232* (2013.01); *Y02T 50/60* (2013.01)

(58) Field of Classification Search
CPC ....... B64D 33/08; F04D 19/02; F04D 27/009; F05D 2220/32; F05D 2240/24; F05D 2260/232; Y02T 50/60
See application file for complete search history.

(56) References Cited

U.S. PATENT DOCUMENTS

| | | | |
|---|---|---|---|
| 4,249,371 A * | 2/1981 | Romeyke | F01D 21/00 60/39.091 |
| 4,291,531 A | 9/1981 | Campbell | |
| 4,452,037 A | 6/1984 | Waddington et al. | |
| 4,653,267 A | 3/1987 | Brodell et al. | |
| 5,357,742 A | 10/1994 | Miller | |
| 5,385,012 A | 1/1995 | Rowe | |
| 5,439,353 A | 8/1995 | Cook et al. | |
| 5,965,240 A | 10/1999 | Blackburn et al. | |
| 6,098,395 A * | 8/2000 | North | F01D 5/085 60/782 |
| 6,132,857 A | 10/2000 | Champenois et al. | |
| 6,141,951 A | 11/2000 | Krukoski et al. | |
| 6,498,978 B2 | 12/2002 | Leamy et al. | |
| 6,575,699 B1 | 6/2003 | Jones | |
| 7,510,778 B2 | 3/2009 | Bernard et al. | |
| 7,744,346 B2 | 6/2010 | Schreiber et al. | |
| 7,766,610 B2 | 8/2010 | Busekros et al. | |
| 7,780,410 B2 | 8/2010 | Kray et al. | |
| 7,780,420 B1 | 8/2010 | Matheny | |
| 7,805,839 B2 | 10/2010 | Cammer | |
| 8,137,073 B2 | 3/2012 | Giusti et al. | |
| 8,240,975 B1 | 8/2012 | Ryznic | |
| 8,721,265 B1 * | 5/2014 | Brostmeyer | F04D 19/02 415/1 |
| 8,776,530 B2 | 7/2014 | Shirooni et al. | |
| 8,820,046 B2 | 9/2014 | Ross et al. | |
| 8,820,091 B2 | 9/2014 | Tham et al. | |
| 8,893,512 B2 | 11/2014 | Donahoo et al. | |
| 9,091,173 B2 | 7/2015 | Mosley et al. | |
| 9,121,309 B2 | 9/2015 | Geiger | |
| 10,009,175 B2 | 6/2018 | Varcoe et al. | |
| 2002/0173897 A1 | 11/2002 | Leamy et al. | |
| 2006/0260323 A1 | 11/2006 | Moulebhar | |
| 2007/0031249 A1 | 2/2007 | Jones | |
| 2007/0267540 A1 * | 11/2007 | Atkey | B64D 13/06 244/58 |
| 2008/0253922 A1 | 10/2008 | Trimmer et al. | |
| 2009/0025365 A1 | 1/2009 | Schilling et al. | |
| 2009/0235670 A1 | 9/2009 | Rostek et al. | |
| 2009/0301053 A1 | 12/2009 | Geiger | |
| 2010/0189551 A1 | 7/2010 | Ballard, Jr. et al. | |
| 2010/0326089 A1 * | 12/2010 | Weber | F01D 17/145 60/783 |
| 2010/0329863 A1 | 12/2010 | Kray et al. | |
| 2011/0027096 A1 | 2/2011 | Northfield | |
| 2011/0049297 A1 | 3/2011 | Jevons et al. | |
| 2011/0182741 A1 | 7/2011 | Alexander | |
| 2011/0211967 A1 | 9/2011 | Deal et al. | |
| 2011/0229334 A1 | 9/2011 | Alexander | |
| 2011/0232294 A1 | 9/2011 | Ross et al. | |
| 2012/0003100 A1 | 1/2012 | James et al. | |
| 2012/0301292 A1 | 11/2012 | Deal et al. | |
| 2012/0316748 A1 | 12/2012 | Jegu et al. | |
| 2013/0091850 A1 | 4/2013 | Francisco | |
| 2014/0230400 A1 | 8/2014 | Light et al. | |
| 2014/0236451 A1 | 8/2014 | Gerez et al. | |
| 2014/0352324 A1 | 12/2014 | Ernst et al. | |
| 2014/0373553 A1 | 12/2014 | Zaccaria et al. | |
| 2015/0044022 A1 | 2/2015 | Bagni et al. | |
| 2015/0047359 A1 | 2/2015 | Maguire et al. | |
| 2015/0184593 A1 * | 7/2015 | Kraft | F02C 6/18 60/782 |
| 2015/0252729 A1 | 9/2015 | Niggemeier et al. | |

FOREIGN PATENT DOCUMENTS

| | | |
|---|---|---|
| JP | S55-49532 A | 4/1980 |
| JP | 2000-356140 A | 12/2000 |
| JP | 2015-505597 A | 2/2015 |
| JP | 2015-140691 A | 8/2015 |
| JP | 2015/522998 A | 8/2015 |

OTHER PUBLICATIONS

Diepolder, W., "Design Features and Procedures to Reduce the Phenomenon of HP—Rotor Bow on Jet Engines," retrieved on Sep. 23, 2009 from website http://www.mtu.de/en/technologies/engineering_news/development/33949Diepolder-September.pdf (12 pgs).

Office Action issued in connection with corresponding CA Application No. 2951671 dated Nov. 20, 2017.

Extended European Search Report and Opinion issued in connection with corresponding EP Application No. 16203525.7 dated May 9, 2017.

European Search Report Corresponding to Application No. 20171985 dated Jun. 24, 2020.

Machine Translated Japanese Office Action Corresponding to Application No. 2016246078 dated Oct. 26, 2018.

* cited by examiner

SYSTEM AND METHOD OF REDUCING POST-SHUTDOWN ENGINE TEMPERATURES

BACKGROUND

The field of the disclosure relates generally to cooling a gas turbine engine and, more particularly, to a method and system to reduce post-shutdown engine temperatures.

During normal operations temperatures of gas turbine engine components is maintained within allowable limits by a plurality of cooling systems that circulate cooling fluids to and from the components to transfer the heat to one or more sinks. When the engine is shutdown, most cooling systems no longer operate. Residual heat in the engine can increase the temperature of the engine components beyond the allowable limits. Moreover, additional heat on the engine rotor over time, and with the rotor being stationary can cause the engine rotor to bow. Additionally, the increased temperatures after shutdown can cause oil coking or charring. Residual heat removal after engine shut down reduces the temperature of the engine components and prevents bowed rotors.

Some known methods of mitigating the effects of residual heat includes rotating the rotor after engine shutdown, adding a new system to blow cooling air into the engine, and purging the oil with a high pressure air system after shutdown to prevent coking. Rotating the rotors, blowing air into the engine, and purging oil with high pressure air after engine shutdown all require additional equipment to cool the engine. Adding additional equipment increases the weight of the engine and decreases fuel efficiency.

BRIEF DESCRIPTION

In one aspect, a cooling system configured to reduce a temperature within a gas turbine engine in a shutdown mode of operation is provided. The cooling system includes a first gas turbine engine including a compressor having a bleed port. In a first operating mode of the gas turbine engine, the compressor bleed port is configured to channel a high pressure flow of air from the compressor. During a shutdown mode of operation, the compressor bleed port is configured to channel an external flow of cooling air into the compressor. The cooling system also includes a source of cooling air and a conduit coupled in flow communication between the compressor bleed port and the source of cooling air. The source of cooling air configured to deliver a flow of cooling air into the compressor through the compressor bleed port.

In another aspect, a method of cooling a gas turbine engine is provided. The method includes channeling a plurality of flows of cooling fluid from a source of a flow of cooling fluid to a conduit. The method also includes channeling the plurality of flows of cooling fluid from the conduit to an engine casing. The method further includes expelling the flow of cooling fluid into a compressor disposed within the engine casing.

In yet another aspect, an aircraft is provided. The aircraft includes a plurality of gas turbine engines. Each gas turbine engine of the plurality of gas turbine engines includes a compressor having a bleed port. In a first operating mode of the aircraft, the compressor bleed ports are configured to channel a high pressure flow of air from the compressors. During a shutdown mode of operation, the compressor bleed ports are configured to channel an external flow of cooling air into the compressors. The aircraft also includes a source of cooling air and a conduit coupled in flow communication between the compressor bleed ports and the source of cooling air. The source of cooling air configured to deliver a flow of cooling air into the compressor through the compressor bleed port.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a schematic view of gas turbine engine cooling system.

FIG. 2 shows a method for cooling a gas turbine engine.

Figure 1:
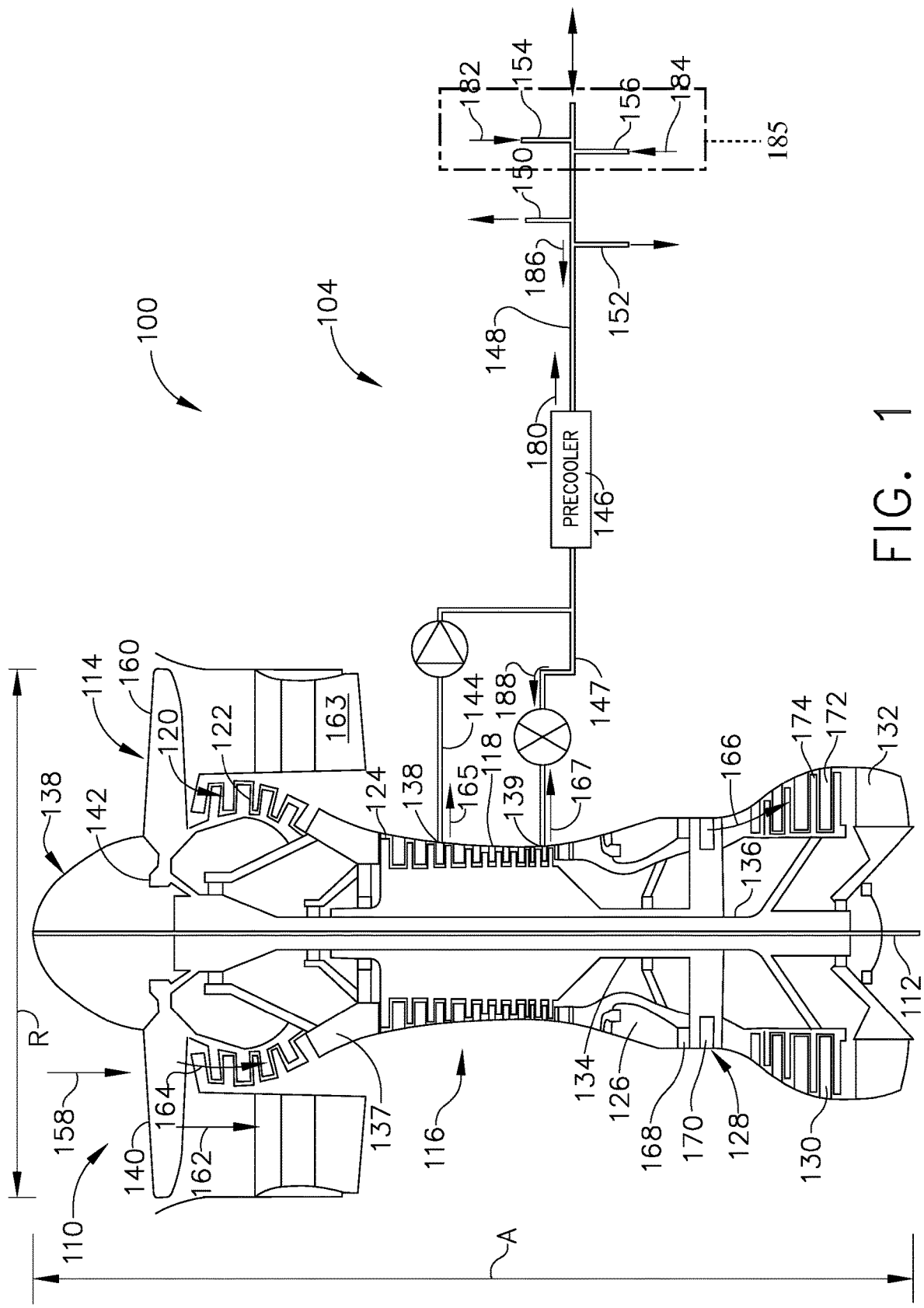
FIGS. 1-2 shows example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. It is contemplated that the disclosure has general application to a method and system for cooling an aircraft engine at shutdown.

Embodiments of the gas turbine engine cooling system described herein cool a gas turbine engine after shutdown of the engine. The gas turbine engine cooling system includes a source of cooling air coupled to an engine through a plurality of conduits. The conduits are connected to the gas turbine engine through compressor bleed valves located on the engine. The gas turbine engine also includes a jet exhaust nozzle section. During normal operation, compressed air from the engine is directed through the compressor bleed valves and into the conduits. The conduits are coupled to a pre-cooler that cools the compressed air before directing the air to the airplane for use in various applications, such as, but, not limited to, the wing anti-ice system and the environmental control system (ECS). After the gas turbine engine is shut down, cooling air is directed into the conduits from the source of cooling air. In various embodiments the source of cooling air includes an auxiliary power unit (APU) or a source of cooling air located on the ground. The conduits direct the cooling air through the pre-cooler and into the compressor bleed valves. The cooling air enters the gas turbine engine and cools the engine components. The cooling air exits the engine through the inlet and/or jet exhaust nozzle section.

The gas turbine engine cooling system described herein offers advantages over known methods of cooling a gas turbine engine after engine shutdown. More specifically, some known gas turbine engine cooling systems use separate systems to cool the shutdown engine. Gas turbine engine cooling systems that use the existing compressor bleed system reduce the weight of the aircraft engine by eliminating a need for additional gas turbine engine cooling components. Furthermore, separate gas turbine engine cooling systems increase the complexity of gas turbine engines by increasing the number of systems in the engine.

FIG. 1 is a schematic cross-sectional view of a gas turbine engine cooling system 100 in accordance with an exemplary embodiment of the present disclosure. Gas turbine engine cooling system 100 includes a gas turbine engine 110, referred to herein as "gas turbine engine 110." Gas turbine engine cooling system 100 also includes a gas turbine engine bleed system 104 coupled in flow communication to gas turbine engine 110. As shown in FIG. 1, gas turbine engine 110 defines an axial direction A (extending parallel to a longitudinal centerline 112 provided for reference) and a radial direction R. In general, gas turbine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, turbine section, and nozzle section 132 together define a core air flow path 137. Outer casing 118 includes an intermediate pressure bleed valve 138 and a high pressure bleed valve 139.

For the embodiment depicted, fan section 114 includes a variable pitch fan 160 having a plurality of fan blades 140 coupled to a disk 142 in a spaced apart manner. As depicted, fan blades 140 extend outwardly from disk 142 generally along radial direction R. Fan blades 140 and disk 142 are together rotatable about longitudinal axis 112 by LP shaft 136.

Gas turbine engine bleed system 104 includes an intermediate pressure conduit 144 coupled in flow communication with intermediate pressure bleed valve 138 and a bleed system pre-cooler 146. Gas turbine engine bleed system 104 also includes a high pressure conduit 147 coupled in flow communication with high pressure bleed valve 139 and bleed system pre-cooler 146. Bleed system pre-cooler 146 is coupled in flow communication with header conduit 148 which is coupled in flow communication with a plurality of connections including an air condition packs connection 150, a wing anti-ice connection 152, a ground connection 154, and an auxiliary power unit (APU) connection 156.

During operation of gas turbine engine 110, a volume of air 158 enters gas turbine 110 through an associated inlet 120 of fan section 114. As volume of air 158 passes across fan blades 140, a first portion of air 158 as indicated by arrows 162 is directed or routed into a bypass airflow passage 163 and a second portion of air 158 as indicated by arrow 164 is directed or routed into core air flow path 137, or more specifically into LP compressor 122. The pressure of second portion of air 164 is then increased as it is routed through HP compressor 124 and into combustion section 126, where it is mixed with fuel and burned to provide combustion gases 166. An intermediate pressure portion of air as indicated by arrow 165 is directed into intermediate pressure bleed valve 138. A high pressure portion of air as indicated by arrow 167 is directed into high pressure bleed valve 139.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate, thereby supporting operation of LP compressor 122 and/or rotation of fan 138. Combustion gases 166 are subsequently routed through jet exhaust nozzle section 132 to provide propulsive thrust.

Intermediate pressure portion of air 165 is directed into intermediate pressure conduit 144 which directs intermediate pressure portion of air 165 to bleed system pre-cooler 146. In an alternative operating embodiment, high pressure portion of air 167 is directed into high pressure conduit 147 which directs high pressure portion of air 167 to bleed system pre-cooler 146. Bleed system pre-cooler 146 cools either intermediate pressure portion of air 165 or high pressure portion of air 167 and directs the cooled air as indicated by arrow 180 to header conduit 148. Header conduit 148 directs cooled air 180 to air condition packs connection 150 and wing anti-ice connection 152. Cooled air 180 directed to air condition packs connection 150 is used to air condition the airplane cabin. Cooled air 180 directed to wing anti-ice connection 152 is used to de-ice the airplane wings. Conduits and connections 180, 150, 152, 154, and 156 may be configured in any configuration that enables operation of the gas turbine engine bleed system 104.

After gas turbine engine 110 is shut down, air from ground connection 154 as indicated by arrow 182 or air from APU connection 156 as indicated by arrow 184 is directed into header conduit 148. These air sources may generally be referred to as a source of cooling air 185. Air in header conduit 148 as indicated by arrow 186 is directed to bleed system pre-cooler 146 which directs air in header conduit 186 to either high pressure conduit 147 as indicated by arrow 188 or intermediate pressure conduit 144 as indicated by arrow 190. Air in high pressure conduit 188 or air in intermediate pressure conduit 190 is directed into HP compressor 124 and cools components of gas turbine engine 110. Air in high pressure conduit 188 or air in intermediate pressure conduit 190 is then directed into combustion section 126, HP turbine 128, and LP turbine 130. Air in high pressure conduit 188 or air in intermediate pressure conduit 190 exist gas turbine engine 110 through jet exhaust nozzle section 132 end inlet 120.

The flow rate of air into gas turbine engine 110 is determined based on the operational history of gas turbine engine 110 and the time elapsed since the last shutdown of gas turbine engine 110. The flow rate of air into gas turbine engine 110 may also be determined based on the flowrate required to cool a rotor of the gas turbine engine to a predetermined temperature in a predetermined amount of time. Additionally, the flow rate of air into gas turbine engine 110 may also be determined based on the flowrate required to cool a rotor of the gas turbine engine before the rotor bows.

Figure 3:
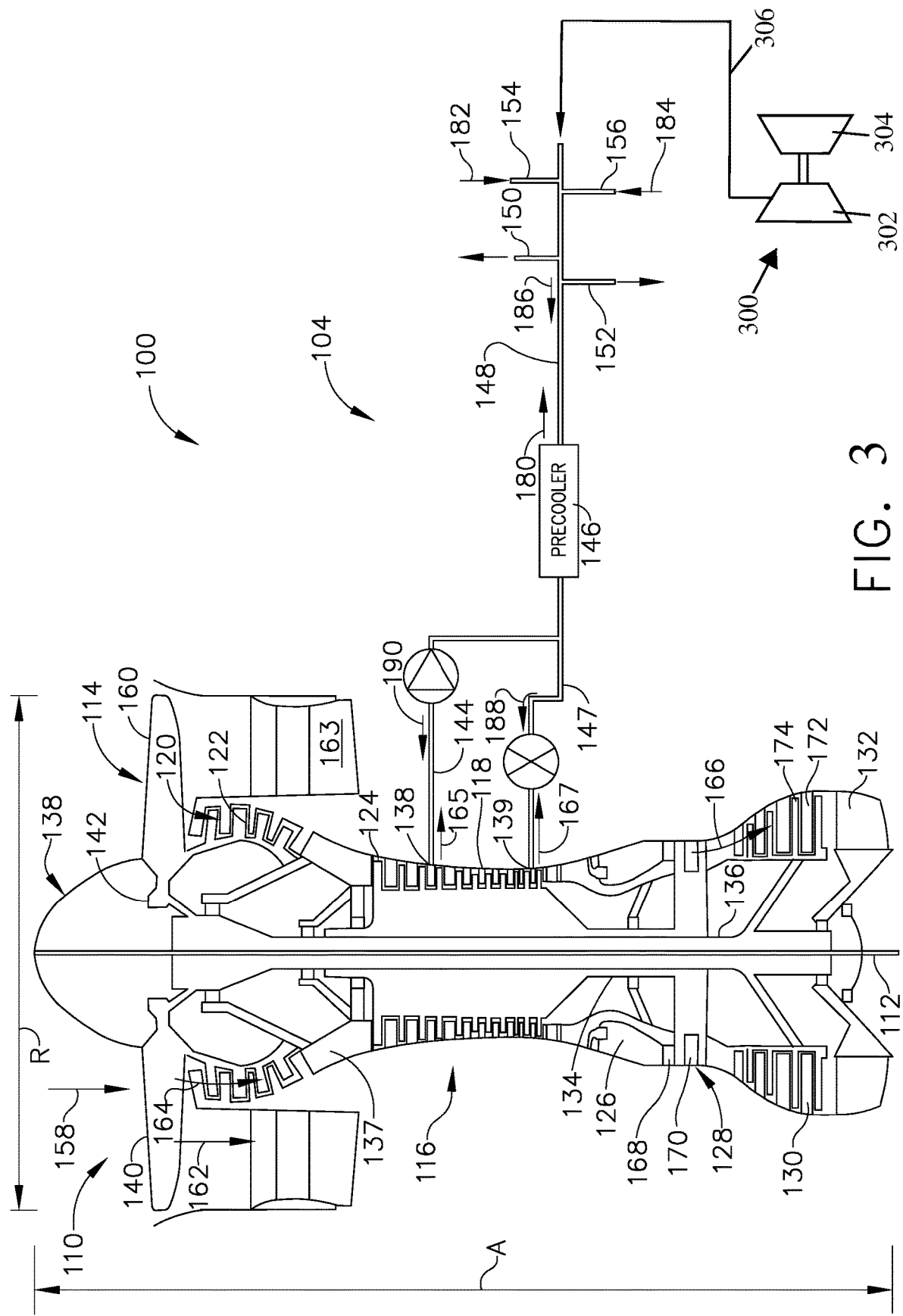
FIG. 3 is a schematic view of gas turbine engine cooling system.

In an alternative embodiment, an aircraft includes gas turbine engine bleed system 104 coupled in flow communication to a plurality of gas turbine engines 110. As previously discussed, air from ground connection 154 as indicated by arrow 182 or air from APU connection 156 as indicated by arrow 184 is directed into header conduit 148 and cools components of gas turbine engines 110. Such a configuration is depicted schematically in FIG. 3. Specifically, FIG. 3 shows a second gas turbine engine 300 having a compressor section 302 and turbine section 304 in serial flow order, with an airflow path 306 to/from the compressor section 302. In such a manner, air from ground connection 154 as indicated by arrow 182 or air from APU connection 156 as indicated by arrow 184 may be directed into header conduit 148 and airflow path 306 to cool components of the first gas turbine engine 100 in the manner described above and components of the second gas turbine engine 300 in substantially the same manner. In such a manner, it will further be appreciated that the conduit 146 may be coupled in flow communication between the engines 110, 300. In an alternative embodiment, a single gas turbine engine of the plurality of gas turbine engines 110 directs air into header conduit 148 and cools components of gas turbine engines 110.

It should be appreciated, however, that exemplary gas turbine engine 110 depicted in FIG. 1 is by way of example only, and that in other exemplary embodiments, gas turbine engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine.

Figure 2:
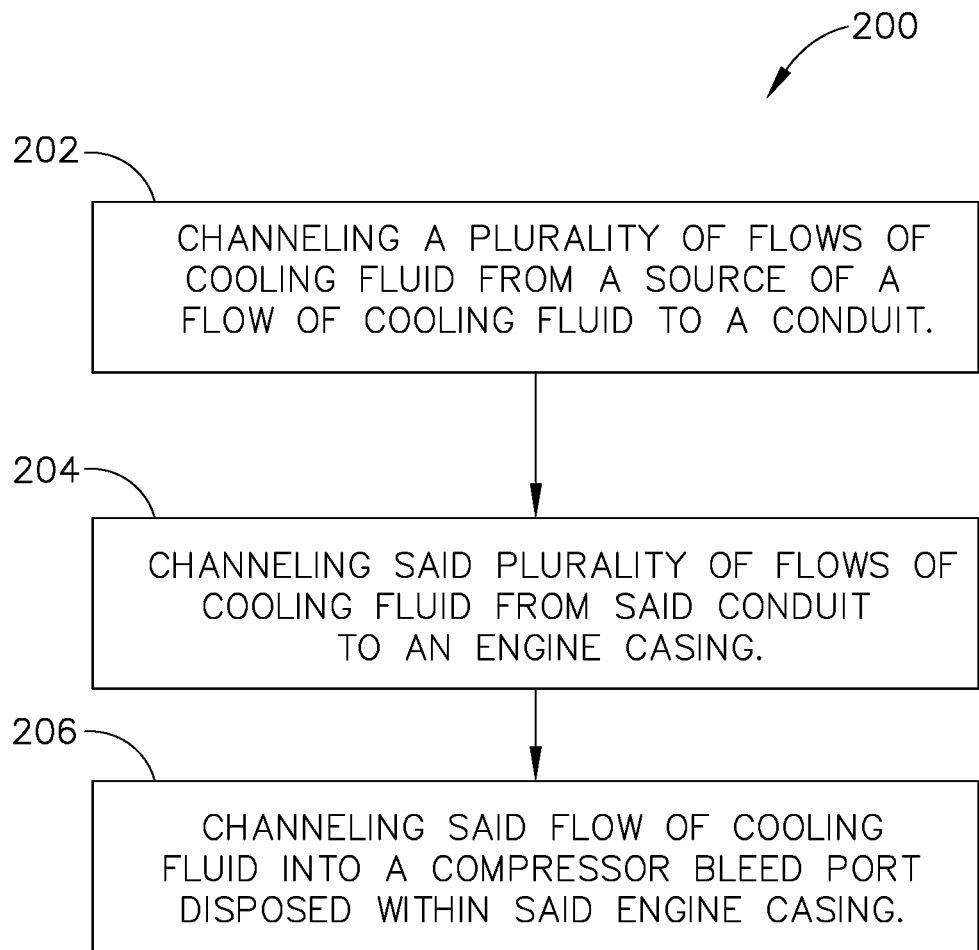

FIG. 2 is a flow diagram of a method 200 of cooling a gas turbine engine, such as, gas turbine engine 110 (shown in FIG. 1). Method 200 includes channeling 202 a plurality of flows of cooling fluid from a source of a flow of cooling fluid to a conduit. The source of cooling fluid in step 202 includes, but is not limited to, an APU or a ground connection such as an airport ground connection or a cooling fluid supplying truck as previously discussed. Additionally, cooling fluid includes compressed air and conduit includes header conduit 148 as previously discussed. Method 200 further includes channeling 204 the plurality of flows of cooling fluid from the conduit to an engine casing and channeling 206 the flow of cooling fluid into a compressor bleed port disposed within the engine casing.

The above-described gas turbine engine cooling system provides an efficient method for cooling a gas turbine engine after engine shutdown. Specifically, the above-described gas turbine engine cooling system uses the existing compressor bleed system to cool the gas turbine engine after shutdown. Using the existing compressor bleed system reduces the number of systems in an aircraft engine and reduces the complexity of the engine. As such, using the existing compressor bleed system reduces the weight of the engine.

Exemplary embodiments of a method and system for reducing post-shutdown engine temperatures are described above in detail. The system for reducing post-shutdown engine temperatures, and methods of operating such systems and devices are not limited to the specific embodiments described herein, but rather, components of systems and/or steps of the methods may be utilized independently and separately from other components and/or steps described herein. For example, the methods may also be used in combination with other systems requiring post-shutdown engine temperature reduction, and are not limited to practice with only the systems and methods as described herein. Rather, the exemplary embodiment can be implemented and utilized in connection with many other machinery applications that are currently configured to receive and accept systems for reducing post-shutdown engine temperatures.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling system, said system comprising:
a gas turbine engine comprising a compressor having a compressor bleed port, wherein in a first operating mode of the gas turbine engine the compressor bleed port is configured to channel a high pressure flow of air from a working fluid flow path of the compressor, and wherein in a shutdown mode of operation, the compressor bleed port is configured to channel a flow of cooling air into the compressor to one or more engine components, the flow of cooling air being from an air source external to the gas turbine engine, the air source being a cool air source for providing the flow of cooling airflow at a temperature less than a temperature of the one or more engine components in the shutdown mode of operation of the engine; and
a conduit coupled in flow communication between the compressor bleed port and the source of cooling air, wherein said source of cooling air is an auxiliary power unit, wherein during the shutdown mode the conduit is configured to deliver the flow of cooling air from the air source external to the gas turbine engine into the compressor working fluid flow path of the compressor through said compressor bleed port.

2. The system of claim 1, wherein during the shutdown mode of operation, a rate of the flow of cooling air is controlled based on an operating history of the gas turbine engine and a time since shutdown of the gas turbine engine.

3. The system of claim 1, wherein during the shutdown mode of operation, a rate of the flow of cooling air is controlled to cool a rotor of the gas turbine engine to a predetermined temperature in a predetermined amount of time.

4. The system of claim 1, wherein said one or more engine components include a rotor of the gas turbine engine.

5. The system of claim 1, further comprising a second gas turbine engine comprising a second compressor having a second bleed port, in a first operating mode of said second gas turbine engine said second compressor bleed port is configured to channel a second high pressure flow of air from said second compressor, during a shutdown mode of operation of said second gas turbine engine, said second compressor bleed port is configured to channel a second external flow of cooling air into said second compressor.

6. A method of cooling a gas turbine engine via a cooling system, the cooling system comprising:
a gas turbine engine comprising a compressor having a compressor bleed port, wherein in a first operating mode of the gas turbine engine the compressor bleed port is configured to channel a high pressure flow of air from a working fluid flow path of the compressor, and wherein in a shutdown mode of operation, the compressor bleed port is configured to channel a flow of cooling air into the compressor to one or more engine components, the flow of cooling air being from an air source external to the gas turbine engine, the air source being a cool air source for providing the flow of cooling airflow at a temperature less than a temperature of the one or more engine components in the shutdown mode of operation of the engine; and
a conduit coupled in flow communication between the compressor bleed port and the source of cooling air, wherein said source of cooling air is an auxiliary power unit, wherein during the shutdown mode the conduit is configured to deliver the flow of cooling air from the air source external to the gas turbine engine into the compressor working fluid flow path of the compressor through said compressor bleed port, wherein said method comprises:
channeling a flow of cooling fluid from the source of cooling air to the conduit;
channeling the flow of cooling fluid from the conduit to an engine casing; and
channeling the flow of cooling fluid into the compressor bleed port disposed within the engine casing.

7. The method of claim 6, wherein channeling the flow of cooling fluid from the source of cooling air to the conduit comprises channeling a flow of compressed air from a source of compressed air to the conduit.

8. The method of claim 6, wherein channeling the flow of cooling fluid from the conduit to the engine casing comprises channeling the flow of cooling fluid from the conduit to the compressor bleed port on the engine casing.

9. The method of claim 6, wherein channeling the flow of cooling fluid into the compressor bleed port disposed within the engine casing comprises channeling the flow of cooling fluid into a high pressure compressor of the compressor disposed within the engine casing.

10. An aircraft comprising:
a plurality of gas turbine engines, each gas turbine engine of the plurality of gas turbine engines comprising a compressor having a compressor bleed port, in a first operating mode of the aircraft, said compressor bleed ports are configured to channel a high pressure flow of air from said compressors, during a shutdown mode of operation, said compressor bleed ports are configured to channel a flow of cooling air into said compressors, the flow of cooling air being an external flow of cooling air;
a source of cooling air; and
a conduit coupled in flow communication between said compressor bleed ports and said source of cooling air, said source of cooling air configured to deliver the flow of cooling air into said compressors through said compressor bleed ports.

11. The aircraft of claim 10, wherein during the shutdown mode of operation, a rate of the flow of cooling air is controlled based on an operating history of the aircraft and a time since shutdown of the aircraft.

12. The aircraft of claim 10, wherein during the shutdown mode of operation, a rate of the flow of cooling air is controlled to cool a rotor of the gas turbine engine to a predetermined temperature in a predetermined amount of time.

13. The aircraft of claim 10, wherein said source of cooling air is a gas turbine engine of said plurality of gas turbine engines.

14. The aircraft of claim 10, wherein said source of cooling air is an auxiliary power unit.

15. The aircraft of claim 10, wherein said source of cooling air is a ground-based source.

* * * * *